Figure 1:
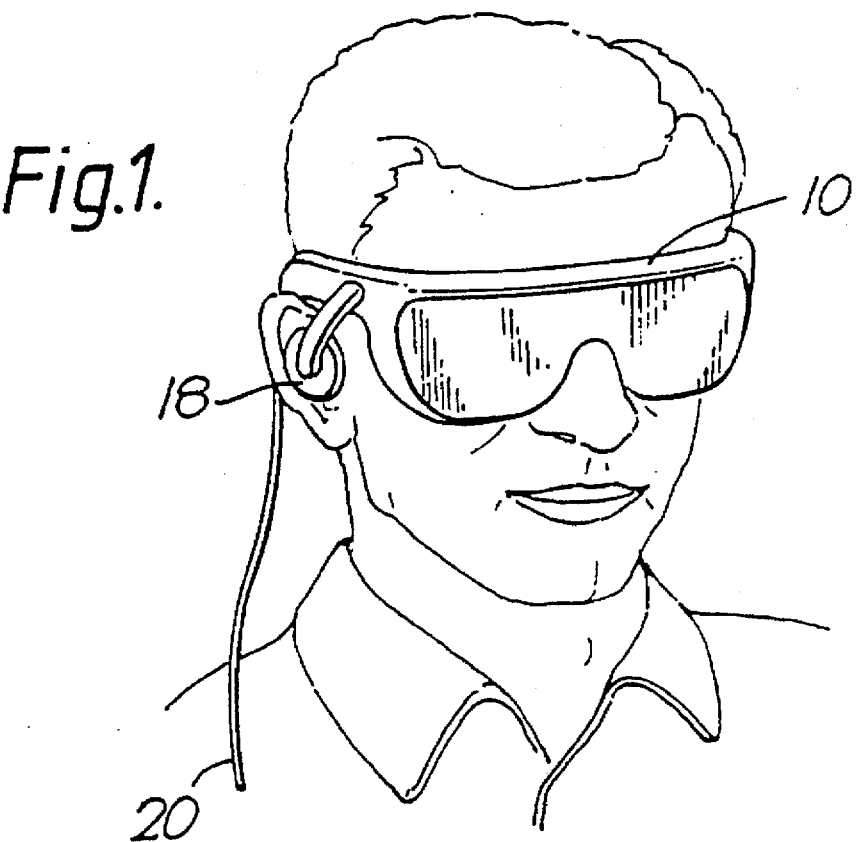

United States Patent

Johnson

Patent Number: 5,719,588
Date of Patent: Feb. 17, 1998

[54] VIEWING DEVICE

[75] Inventor: William Nevil Heaton Johnson, Lymington, England

[73] Assignees: Nashua Corporation, Nashua, N.H.; Nashua Photo Limited, Devon, England

[21] Appl. No.: 671,008

[22] Filed: Jun. 28, 1996

Related U.S. Application Data

[63] Continuation of Ser. No. 133,186, filed as PCT/GB92/00396, Mar. 6, 1992, published as WO92/16075, Sep. 17, 1992, abandoned.

[30] Foreign Application Priority Data

Mar. 8, 1991 [GB] United Kingdom ............ 9104960
Mar. 22, 1991 [GB] United Kingdom ............ 9106132

[51] Int. Cl.⁶ ............................................. G09G 5/00
[52] U.S. Cl. ............................. 345/8; 348/53; 349/11
[58] Field of Search ......................... 345/7, 8, 9, 84; 348/51–54; 351/158; 359/629, 630; 430/321; 349/11, 57

[56] References Cited

U.S. PATENT DOCUMENTS

| | | | |
|---|---|---|---|
| 2,955,156 | 10/1960 | Heilig | 178/6.5 |
| 4,021,846 | 5/1977 | Roese | 358/92 |
| 4,026,634 | 5/1977 | Fukushima | 350/128 |
| 4,298,246 | 11/1981 | Iwamura | 350/122 |
| 4,395,731 | 7/1983 | Schoolman | 358/88 |
| 4,636,866 | 1/1987 | Hattori | 358/236 |
| 4,706,117 | 11/1987 | Schoolman | 358/88 |
| 4,933,755 | 6/1990 | Dahl et al. | 358/88 |
| 4,982,278 | 1/1991 | Dahl et al. | 358/88 |
| 5,034,809 | 7/1991 | Katoh | 358/88 |
| 5,159,478 | 10/1992 | Akiyama et al. | 359/69 |
| 5,300,942 | 4/1994 | Dolgoff | 345/84 |
| 5,324,623 | 6/1994 | Tsumori | 430/321 |

FOREIGN PATENT DOCUMENTS

| | | |
|---|---|---|
| 0438362 | 7/1991 | European Pat. Off. . |
| 0294122 | 1/1993 | European Pat. Off. . |
| 8906544 | 11/1990 | France . |
| 63-294186 | 11/1988 | Japan . |
| 8401680 | 4/1984 | WIPO . |

*Primary Examiner*—Steven Saras
*Attorney, Agent, or Firm*—Webb Ziesenheim Bruening Logsdon Orkin & Hanson, P.C.

[57] ABSTRACT

A viewing device for receiving video signals and generating corresponding images for viewing comprising a frame or support, adapted to be worn on the user's head, for example, a frame similar to a spectacle frame. The frame supports a pixelated LCD screen in front of each of the wearer's eyes. Respective optical systems located between the user's eyes and the screens allow the user to view the images generated as if they were at infinity. A light-transmitting microlens screen may be located in front of each LCD screen to produce an improved subjective viewing impression by "de-pixelating" the image.

13 Claims, 1 Drawing Sheet

VIEWING DEVICE

This is a continuation of application Ser. No. 08/133,186, filed as PCT/GB92/00396, Mar. 6, 1992, published as WO92/16075, Sep. 17, 1992 now abandoned.

This invention relates to a viewing device for presenting to a user visual images, such as televised images or recorded video images.

Conventionally, televised images are viewed on screens which, for practical and technical reasons, occupy a relatively small portion of the visual field of the viewer, so that the visual effect is generally inferior even to that enjoyed by a person viewing a film in a cinema, although even in this case the image viewed may occupy only a minor part of the viewer's visual field. The above-noted drawback is, if anything, greater in the case of the so-called "pocket" television receivers now available and where, by virtue of the extreme miniaturisation of the viewing screen, the proportion of the user's field of view which can be occupied by the picture area is limited by the minimum viewing distance which the user's eyes can comfortably accommodate.

It is among the objects of the present invention to provide an improved viewing device which is portable and yet can provide a picture or display occupying a major part of the user's visual field.

According to the invention, there is provided a viewing device comprising a frame or support adapted to be worn on the user's head, and supporting, so as to be in front of the user's eyes, imaging display means for presenting or reproducing a visual image, and an associated optical system whereby there may be presented to the user's view an image presented or reproduced by said display means, at a comfortable subjective viewing distance.

Preferably said imaging display means comprises a television or video display driven by appropriate circuitry carried by said frame or incorporated in a unit separate from said frame but connected therewith by signal conducting means.

Figure 2:
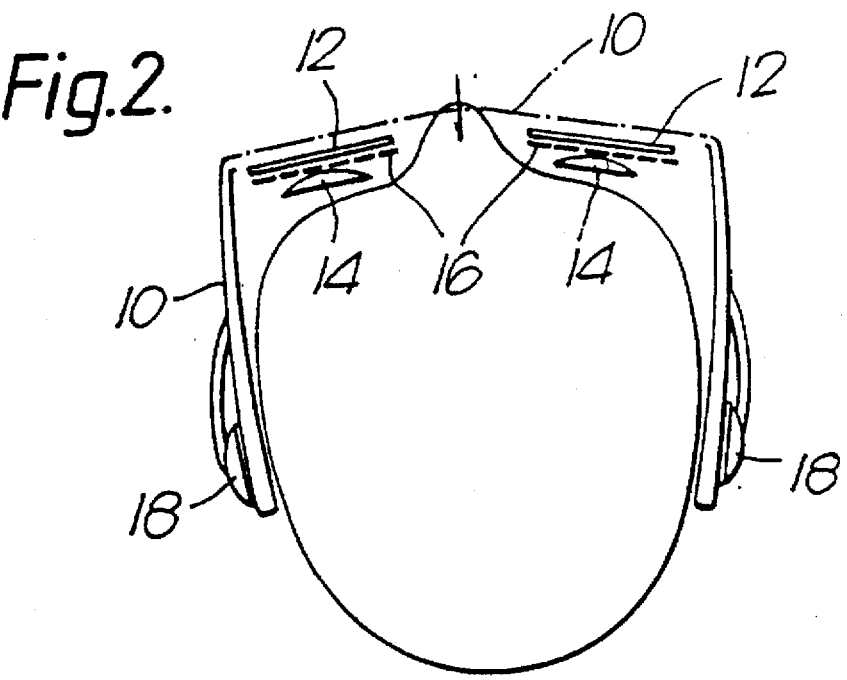

An embodiment of the invention is described below by way of example, with reference to the accompanying drawings, in which:

FIG. 1 is a perspective view illustrating a device embodying the invention being worn by a user, and FIG. 2 is a schematic plan view, corresponding to FIG. 1.

Referring to the drawings, a viewing device embodying the invention comprises a frame 10 which may as illustrated take the general form of a pair of spectacles or goggles. As shown in FIG. 2, the frame 10 supports, in front of each eye of the wearer, a respective display screen 12 (viewed upper edge-on in FIG. 2) and a respective converging lens or lens system (represented schematically, as a single lens, at 14) through which the respective eye of the user can view, at infinity, a virtual image of the picture area or display area of the respective screen 12. In order to allow the device to be used by a person who is short-sighted and is not using corrective optics independent of the viewing device, the power of the lenses 14 may be adjustable so as to present such virtual image at the appropriate furthest limit of clear vision of the respective eye of the user. It will be appreciated that, in the interests of compactness, the screen 12, lens 14 and the user's eye should all be as close together as possible, which also allows the size, and thus the weight of each screen 12 and lens or lens system 14 to be minimised.

Each display screen is preferably an LCD screen of the general type used in known hand-held or "pocket" television receivers, and is thus divided into an array or grid of pixels capable of being activated selectively by associated conductors connected with control circuitry, not shown, and which control circuitry, in the preferred embodiment, as in such known hand-held or "pocket" television receivers, is in turn controlled by television-signal receiving and processing circuitry or by other video-signal-processing circuitry, whereby each pixelated screen 12, in operation of the device, will display a televised picture transmitted on a television channel to which said receiving circuitry is tuned or will display a picture corresponding with such other video signal.

Each screen 12 is back-lit, for example by ambient light passing through the screen 12 from the outer side thereof (i.e. the side furthest from the user's eye), either directly or through a diffusing screen (not shown) located on the outer side of the screen 12, or by a diffuse light source, such as a fluorescent panel, located adjacent the screen 12 on the outer side thereof. The two screens 12 may be energised in parallel by the associated circuitry so that the two screens display precisely the same picture. However, it will be appreciated that the two screens 12 may be energised by respective circuitry to display, during each "frame" period of a T.V. transmission or video recording, respective images of a stereoscopic image pair, so that the wearer will see a three-dimensional or stereoscopic picture. Such a stereoscopic or three-dimensional effect will, of course, only be provided if appropriate stereoscopic picture information is available, i.e. if there is a transmitted stereoscopic television signal, or corresponding stereoscopic picture information, for example derived from a recorder connected with the device.

In order to avoid disturbing effects, on the user's vision, of exposure of the eyes for long periods to entirely pixelated fields of view, and in order to afford a more acceptable viewing impression to the user, a light-transmitting randomising or diffusion screen 16 may be disposed in front of each LCD screen 12, i.e. between the screen 12 and the respective optical system 14. Each such screen 16 preferably takes the form of a microlens screen as hereinafter defined.

The term "microlens screen" is used herein to denote a rear projection screen comprising a sheet of light-transmitting material in or on which is formed, by appropriately configuring one or both surfaces of the sheet, or by causing predetermined localised variations in the refractive index of the sheet material, an array of minute lenses, herein termed "microlenses". Where the lenses are formed by configuring one or both surfaces of the sheet, the microlenses are effectively conventional lenses, for example, plano-convex or bi-convex lenses. Where the lenses are formed by localised variations in the refractive index of the sheet material, the lenses are of the graded refractive index (GRIN) type. The microlens screen may, of course, incorporate both surface configuration and graded refractive index variations contributing to the effectiveness of the microlenses.

Microlens screens falling within the definition set out above are disclosed in Published European Patent Application No. 0294122 to which reference should be had.

In view of the preferred small size of the display screens 12 and the use of the effectively magnifying optical systems 14, the individual microlenses of each screen 16 should be as small as possible and should be packed as closely as possible. By way of example, the diameter of each microlens may be between 5 and 2 microns, with the pitch between adjoining microlenses in each screen being of comparable magnitude. Even smaller microlens sizes and pitches may be utilised, for example down to 1 micron.

Using techniques likewise well known, in the field of hand-held or "pocket" television receivers, the screens 12 are preferably capable of displaying pictures in colour where the device is supplied with a colour T.V. or video signal.

The interposition of the microlens screen 16 between the LCD display and the viewing optics 14 has the effect of removing the otherwise visually obtrusive detail of the pixelation of the LCD display and which detail forms no part of the intended picture content of the image viewed. It will be appreciated that where a colour LCD display is utilised, the colour of any particular element of the picture is represented by the combined illuminations of a respective set of three colour pixels, each providing a respective one of three primary colour components, so that an enlarged, detailed view of the screen 12, in operation, provides substantial and confusing pixelation detail which is not readily perceptible as picture-related.

The microlens screen 16 acts, in a sense, as a spatial Fourier filter removing the high (spatial) frequency image detail which is due to the pixelation leaving only the lower (spatial) frequencies corresponding to actual picture content. In particular the individual colour pixels are no longer discernible as such but respective areas of the microlens screen viewed are perceived as areas of the intended colour merging with adjoining areas without abrupt changes from pixel to pixel.

The resulting picture is subjectively more acceptable to the eye than the "naked" pixelated display.

The use of a microlens screen as opposed to an ordinary diffusion screen for this purpose, makes it possible to achieve the desired Fourier filtering effect without unacceptable loss of brightness or picture detail, "vignetting", "hot spots" or other defects associated with conventional diffusers.

The frame 10 also carries, as indicated schematically at 18, earphones which, when the device is worn, extend over the ears of the user to provide the user with the sound component of the transmitted television or video programme. Such an arrangement, of course, permits relatively high-fidelity sound to be provided to the user at modest cost and furthermore allows the user to obtain the full effect of stereophonic sound transmissions where these are present.

The television-signal receiving and processing circuitry or video and sound-signal processing circuitry may be carried in its entirety by the frame 10, or, if preferred, only the final stage of the circuitry, driving the displays 12, may be carried by the frame 10 and the remainder of the circuitry carried in a separate casing adapted to be carried in a pocket or on a belt, such remainder of the circuitry being connected with that carried by frame 10 by a flexible lead as indicated at 20 in FIG. 1. Thus, for example, the lead 20 may carry an electrical plug at its end remote from the frame 10 for insertion in a socket in such casing. The last-noted configuration allows substantial adaptability whilst allowing the weight of the frame 10 and components carried thereby to be minimised.

The separate casing referred to may, for example, house a compact video tape player or video compact disc and/or television-signal receiving and processing circuitry.

A domestic television receiver may, in addition to or in place of the conventional picture screen, be provided with a socket to receive such a plug, or with a plurality of such sockets to receive respective said plugs from frames worn by a number of individuals so that each individual will have an ideal view of the transmitted or recorded programme material.

The use of the device of the invention substantially solves the problems arising in presenting stereoscopic television picture information to the viewer, in that whilst an individual viewing device or "spectacles" is required (in common with most previously suggested systems for stereoscopic television), the use of such an individual viewing device, is made to afford, in accordance with the invention, other advantages not otherwise readily obtainable, for example in allowing viewing in colour and in avoiding the need for complex screen structures and signal processing techniques, and in obtaining monoscopic/stereoscopic comparability. Whilst the device has been described in terms of the display of televised or pre-recorded video material, it will be appreciated that the device may, for example, be controlled by a microprocessor-based game device or computer, or by any other source of video signals.

With a view to improving uniformity of back-lighting of the screens 12, further diffusion screens of the microlens array type may be placed behind the screens 12, i.e. on the opposite sides of screens 12 from the user's eyes.

Even where the picture information supplied is not stereoscopic, the fact that the viewed picture occupies a major part, at least, of the user's field of view provides the user with the impression of being part of the scene viewed rather than merely a viewer of a relatively small picture of such a scene. This effect is, of course, even more pronounced where the scene viewed is presented stereoscopically.

Whilst the preferred form of the viewing device, as described above, utilises back-lit light-transmitting display screens 12, it will be appreciated that, instead, forward projection, reflective display screens may be utilised onto which real images of the respective video pictures are projected by respective optical systems located to one side of the respective eye of the user, for example mounted on the respective leg of the frame 10. If desired, a respective microlens or other diffusion screen may likewise be utilised in conjunction with such front projection screens.

It will be appreciated that the display screens 12 may be of the high-definition, active matrix type, e.g. of the thin film transistor (TFT) type and that any other present or future improvements to lightweight image screens may likewise be incorporated in a viewing device embodying the invention.

What is claimed is:

1. A viewing device comprising a frame or support adapted to be worn on the user's head and supporting, so as to be in front of each of the user's eyes, a respective video display screen, driving circuitry driving said displays, a respective optical system, supported by said frame or support, interposed between each eye and the respective screen and a respective diffusing or randomising screen interposed between the respective display screen and the respective optical system, such that the light diffusing screen acts as a spatial filter removing the high spatial frequency image detail which is due to pixelation leaving only the lower spatial frequencies corresponding to actual picture content, whereby the pixels are rendered imperceptible, each said video display screen comprising an LCD-pixelated screen, each said diffusing or randomising screen comprising a sheet of light-transmitting material in or on which is formed an array of closely packed microlenses, said microlenses being substantially smaller than the pixels of said LCD-pixelated screen.

2. A display device comprising a video display screen comprising a plurality of individual pixels, and a light diffusing or randomising screen placed in front of the display screen and exposed to direct view in such a way that the diffusing or randomising screen is interposed between the display screen and the viewer, such that the light diffusing or randomising screen acts as a spatial filter removing the high spatial frequency image detail which is due to the pixelation leaving only the lower spatial frequencies corresponding to actual picture content, whereby the pixels are rendered imperceptible, each said video display screen comprising an LCD-pixelated screen, each said diffusing or randomising screen comprising a sheet of light-transmitting material in or on which is formed an array of closely packed microlenses, said microlenses being substantially smaller than the pixels of said LCD-pixelated screen.

3. A viewing device comprising a frame or support adapted to be worn on the user's head and supporting, so as to be in front of each of the user's eyes, a respective video display screen, driving circuitry driving said displays, a respective optical system, supported by said frame or support, interposed between each eye, and the respective screen and a respective diffusing or randomising screen interposed between the respective display screen and the respective optical system, such that the light diffusing screen acts as a spatial filter removing the high spatial frequency image detail which is due to pixelation leaving only the lower spatial frequencies corresponding to actual picture content, whereby the pixels are rendered imperceptible, wherein the light diffusing or randomising screen comprises a sheet of light transmitting material in or on which is formed, an array of closely packed microlenses having a diameter of between 5 and 1 microns.

4. A viewing device according to claim 3 wherein each said video display screen comprises an LCD pixelated screen.

5. A viewing device according to claim 3 wherein each said diffusing or randomising screen comprises a sheet of light transmitting material in which said lenses are formed by localised variations in the refractive index of the sheet material whereby the lenses are of the graded refractive index type.

6. A viewing device according to claim 3 wherein the diameter of each microlens is between 5 and 2 microns.

7. A viewing device according to claim 3 wherein each said video display screen comprises an LCD screen arranged to be back-lit by ambient light or by a diffuse light source and wherein a further diffusing screen is located behind each LCD screen to improve uniformity of backlighting.

8. A viewing device according to claim 3 including respective energising circuitry for each said video display screen whereby said screens may be arranged to display, in each of a succession of display periods, a respective image of a stereoscopic image pair.

9. A viewing device according to claim 3 wherein said driving circuitry includes means for energising the two video display screens to display during each of a succession of frame periods, respective images of a respective stereoscopic image pair, whereby the user can perceive video programme material stereoscopically.

10. A method of removing visually obtrusive detail of the pixelation of a pixilated video display comprising disposing in front of the display, between the display and the viewer, a light diffusing or randomising screen such that the light diffusing screen acts as a spatial filter removing the high spatial frequency image detail which is due to pixelation leaving only the lower spatial frequencies corresponding to actual picture content, whereby the pixels are rendered imperceptible, wherein the light diffusing or randomising screen comprises an array of closely packed microlenses having a diameter between 5 and 1 microns.

11. A display device comprising a video display screen comprising a plurality of individual pixels, and a light diffusing or randomising screen placed in front of the display screen and exposed to direct view in such a way that the diffusing or randomising screen is interposed between the display screen and the viewer, such that the light diffusing or randomising screen acts as a spatial filter removing the high spatial frequency image detail which is due to the pixelation leaving only the lower spatial frequencies corresponding to actual picture content, whereby the pixels are rendered imperceptible, wherein the light diffusing or randomising screen comprises an array of closely packed microlenses having a diameter of between 5 and 1 microns.

12. A display device according to claim 11 wherein the video display screen comprises an LCD screen arranged to be backlit by ambient light or by a diffuse light source and wherein a further diffusing or randomising screen is located behind each LCD screen to improve uniformity of backlighting.

13. A device according to claim 11 wherein said further diffusing or randomising screen located behind the LCD screen comprises a light transmitting sheet incorporating an array of closely packed microlenses.

\* \* \* \* \*

UNITED STATES PATENT AND TRADEMARK OFFICE
CERTIFICATE OF CORRECTION

PATENT NO. : 5,719,588
DATED : February 17, 1998
INVENTOR(S) : William Nevil Heaton Johnson It is certified that error appears in the above-indentified patent and that said Letters Patent is hereby corrected as shown below:

Column 4 Lines 9-10 "comparability" should read --compatability--.

Claim 13 Column 6 Line 39 "according to claim 11" should read --according to claim 12--.

Signed and Sealed this

Ninth Day of June, 1998

Attest:

BRUCE LEHMAN

Attesting Officer           Commissioner of Patents and Trademarks